May 18, 1937. H. P. INGALLS 2,080,920
METHOD OF PRODUCING FROZEN CONFECTIONS
Filed July 10, 1935
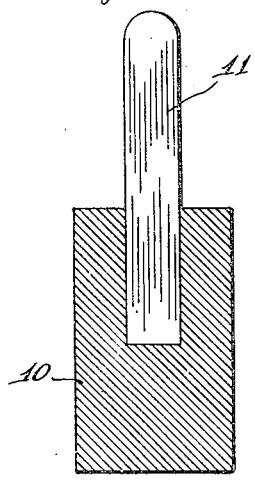
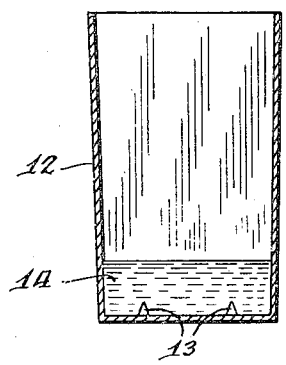
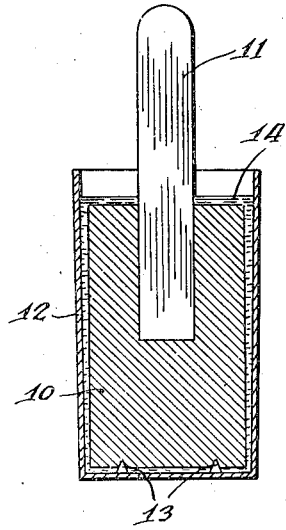
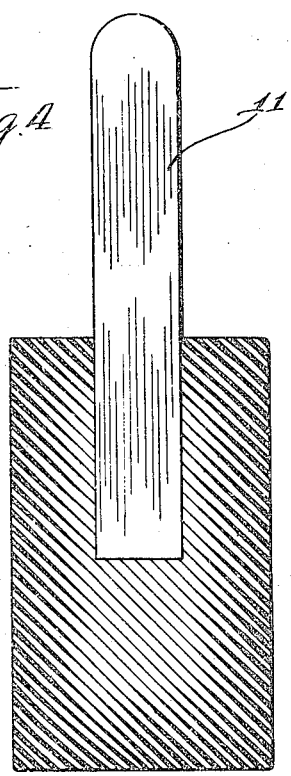
Inventor:
Harry P. Ingalls
By Jones, Addington, Ames & Seibold
Attys.

Patented May 18, 1937

2,080,920

UNITED STATES PATENT OFFICE 2,080,920

METHOD OF PRODUCING FROZEN CONFECTIONS

Harry P. Ingalls, Berwyn, Ill., assignor of one-half to Ellwood F. Whitchurch, Chicago, Ill.

Application July 10, 1935, Serial No. 30,621

3 Claims. (Cl. 107—54)

This invention relates to the method of producing a frozen confection, and has special reference to a frozen confection of a substantially homogeneous mass in which the flavoring material therefor is produced in a concentrated state on the outside thereof and diminishes inwardly therefrom.

In the frozen confections of which applicant now has knowledge, flavor is imparted to the stock material either by mixing the flavoring directly in the stock at the time it is made or by providing a coating or shell of flavoring material on the outside thereof. In the first instance, flavors which are closely allied cannot be effectively used in a mild state such as they are found in ordinary flavored ice cream, because they cannot be readily identified from each other in such a mild state. In the latter instance where a coating or shell of flavoring is supplied about the ice cream, there is an undesirable sensation of biting through the relatively hard shell into a softer inner substance.

Coatings of frozen fruit juices, for example, are icy and hard and are given to cracking and falling off in particles with the consequent soiling of the person or personal effects, besides creating the above-noted undesirable sensation. When these coatings contain a high percentage of syrup or sugar, they are sticky, thereby becoming especially undesirable when coming in contact with the hands of the person. Again, these coatings with a high sugar content are too sweet in their concentrated state for many people and are therefore undesirable.

In flavoring bulk ice cream in the usual manner, some of the delicate flavors are difficult to recognize or taste, such, for example, as peach. Again, closely allied flavors, such as blackberry and raspberry, cannot be identified or distinguished between.

One of the objects of the present invention is to provide a frozen confection consisting of a stock material and a flavoring material in which the flavoring material is in a more highly concentrated state on the outside and diminishes inwardly thereof.

In the above product, by using no more flavoring than is used ordinarily in bulk ice cream, the taste sensation can be made several times stronger, or, in other words, by using less flavoring than is used in ordinary bulk ice cream, the taste can still be made as strong or stronger than the usual flavored ice cream. This is accomplished by placing the flavoring in such a position that it is more concentrated where it contacts the tongue.

Also in the above confection the stock material remains of uniform texture throughout the homogeneous mass and obviates the undesirable characteristics of a product in which the stock material is covered with a comparatively hard or brittle shell. Flavorings containing vegetable oils, such as chocolate coatings, become relatively hard and brittle in the temperature of ice cream, and not being fused with the ice cream, often crack and fall off. Further, such coatings will not readily melt in the mouth; are too rich when combined with the butter fat content of the stock material, and impart a waxy effect which is undesirable and does not exist in the present product where the flavor melts at the same temperature as the stock material or ice cream.

In other words, the stock material flavored in the above manner, wherein the flavor is concentrated at the outside and diminishes inwardly thereof, has the desirable taste sensation of the coated ice cream or that ice cream provided with a shell of flavoring material and yet has the desirable characteristics in uniform texture, for example, of the usual flavored ice cream in which the flavoring is imparted at the time of the manufacture of the ice cream.

Another object of this invention is to provide a new and novel method of producing frozen confections of the above character by subjecting a frozen or solid core of normally liquid stock material to a flavoring material confined in a mold or the like, the flavoring material being in a normally liquid state, and in freezing the composite materials into a solid state in which the product has the above desirable characteristics.

Other objects and advantages will hereinafter be more particularly pointed out, and for a more complete understanding of the characteristic features of this invention, reference may now be had to the further description when taken together with the accompanying drawing, in which latter:

Figure 1 is a central vertical sectional view of the stock material employed in producing the product of this invention;

Fig. 2 is a central vertical sectional view of a mold into which the stock material of Fig. 1 is disposed;

Fig. 3 is a central vertical sectional view of the stock material of Figure 1 as initially disposed in the container of Fig. 2; and Fig. 4 is a central vertical sectional view of the resultant frozen confection.

Referring now more particularly to the drawing, the stock material or core 10 may be made of any edible material which is normally liquid or liquid at normal room temperatures, such as ice cream, and may be provided with a handle 11 or other suitable means for holding the same while being eaten. In the present embodiment, the handle 11 is shown as being of a rigid material, such as cardboard or wood, one portion of the stick being inserted a substantial distance into the stock material 10, and the remaining portion extending beyond the confines of the material to serve as a handle. Of course, the particular means for handling the confection may be of any suitable characteristics, the present disclosure merely being illustrative of one practical method.

The stock material 10 may then be disposed in a suitable container 12, which may be partially filled with a flavoring material 14 in a normal liquid state, the container preferably having a plurality of upwardly extending lugs or other members for positively fixing the position of the stock material in the container. The container preferably converges in a direction toward the bottom thereof to facilitate removal of the resultant confection and is slightly greater in internal width in both directions than the stock material in order that the flavoring 14 may be displaced around the sides thereof to completely immerse the stock material therein. Of course, it is not necessary to displace the liquid material, since it may be poured in about the stock material while in the mold. The spacing members 13 may be pointed projections so that the stock material may not become displaced in any direction, it being desirable to have the flavoring material completely cover the stock material on the top, bottom and all sides.

The mold with its contents may then be subjected to refrigeration in any usual manner.

The flavoring material 14, being in a normal liquid state and being therefore at a substantially higher temperature than that of the frozen stock material or core 10, softens and partially melts the stock material on the outside and commingles therewith. The softening and melting of the stock material occurs during the period of time from which the stock material is placed into a mold until the refrigerating means applied to the mold prevents further softening or melting by lowering the temperature of the flavoring material 14. This results in the stock material on the outside of the mold re-freezing first with the flavoring being concentrated at the outside and diminishing towards the center of the stock material.

It is apparent that, as the flavoring melts the stock material and penetrates towards the center, mixing therewith, the flavoring will eventually give off all of its heat and the limit of penetration will be reached when the flavoring material is too cold to further melt or soften the stock material. The cold transmitted from the center of the stock material and the cold transmitted from the outside of the mold will then freeze the flavored stock material in such a state that the flavoring will be concentrated on the outside to diminish in strength inwardly toward the center of the confection. This resultant product is a relatively homogeneous mixture of stock and flavoring material of substantially uniform texture throughout, the flavoring material being more highly concentrated on the outside of the confection and diminishing inwardly thereof.

While but a single embodiment of this invention is herein shown and described, it is to be understood that various modifications thereof will become apparent to those skilled in the art, without departing from the spirit and scope of this invention, and therefore the same is to be limited only by the scope of the prior art and the appended claims.

I claim:

1. A method of producing frozen confections which consists in subjecting a frozen core of normally liquid material to a confined flavoring material in a normal liquid state, and in freezing the resulting confined composite materials into a solid state with consequent initial commingling of the materials in which the flavoring is concentrated at the outside and diminishes inwardly thereof.

2. A method of producing a frozen confection which consists in subjecting a core of ice cream to a confined flavoring material in a normal liquid state, and in freezing the flavoring material about the ice cream into a solid state with consequent initial melting of the ice cream for mixture with the flavoring material in which the latter is concentrated at the outside and diminishes inwardly thereof.

3. A method of producing frozen confections which consists in inserting a frozen core of normally liquid material into a predetermined amount of confined flavoring material in a normal liquid state, and in freezing the core and flavoring material into a solid state with consequent initial commingling of the materials in which the flavoring is concentrated at the outside and diminishes inwardly thereof.

HARRY P. INGALLS.